US012269281B2

(12) United States Patent
Haigis et al.

(10) Patent No.: US 12,269,281 B2
(45) Date of Patent: Apr. 8, 2025

(54) LABEL PRINTER

(71) Applicant: Bizerba SE & Co. KG, Balingen (DE)

(72) Inventors: Jörg Haigis, Balingen (DE); Patrick Eccard, Burladingen (DE)

(73) Assignee: Bizerba SE & Co. KG, Balingen (DE)

( * ) Notice: Subject to any disclaimer, the term of this patent is extended or adjusted under 35 U.S.C. 154(b) by 139 days.

(21) Appl. No.: 18/269,735

(22) PCT Filed: Oct. 28, 2021

(86) PCT No.: PCT/EP2021/079997
§ 371 (c)(1),
(2) Date: Jun. 26, 2023

(87) PCT Pub. No.: WO2022/144119
PCT Pub. Date: Jul. 7, 2022

(65) Prior Publication Data
US 2024/0051310 A1    Feb. 15, 2024

(30) Foreign Application Priority Data
Dec. 29, 2020    (EP) .................................. 20217577

(51) Int. Cl.
*B41J 3/407*    (2006.01)
*B41J 11/00*    (2006.01)
*B41J 29/13*    (2006.01)

(52) U.S. Cl.
CPC ......... *B41J 3/4075* (2013.01); *B41J 11/0095* (2013.01); *B41J 29/13* (2013.01)

(58) Field of Classification Search
CPC ....... B41J 3/4075; B41J 11/0095; B41J 29/13
See application file for complete search history.

(56) References Cited

U.S. PATENT DOCUMENTS

2008/0024827 A1*  1/2008  Kokubo ............... B65H 7/02
                                                          358/3.26
2014/0227017 A1   8/2014  Kanda et al.
(Continued)

FOREIGN PATENT DOCUMENTS

EP    2103531 B1    4/2016
EP    3266618 B1    2/2019
JP    2007106556 A  4/2007

OTHER PUBLICATIONS

International Search Report and Written Opinion of the International Searching Authority in relation to International Application No. PCT/EP2021/079997, dated Jan. 28, 2022, 11 pages.

*Primary Examiner* — David H Banh
(74) *Attorney, Agent, or Firm* — Bochner PLLC; Andrew Bochner

(57) ABSTRACT

The invention relates to a label printer for printing on a paper tape wound onto a roll, said label printer comprising a printer housing in which a reception space for the roll with the paper tape or for a cartridge comprising the roll is provided, wherein the paper tape can be placed into a paper path; a foldable housing element that is attached to the printer housing and that enables access to the reception space for the insertion and removal of the roll or the cartridge in an open position and prevents access in a closed position, wherein the state of the label printer can be detected, namely whether the housing element is closed or the cartridge is inserted and whether the paper tape is placed into the paper path. A reflection light barrier, comprising a light transmitter for transmitting a transmission light beam and a light receiver for a reflected portion of the transmission light beam, and a further light receiver for a transmitted portion of the transmission light beam are provided, with the reflection light barrier being provided at the printer housing and the further light receiver being provided at the housing (Continued)

Figure 1:
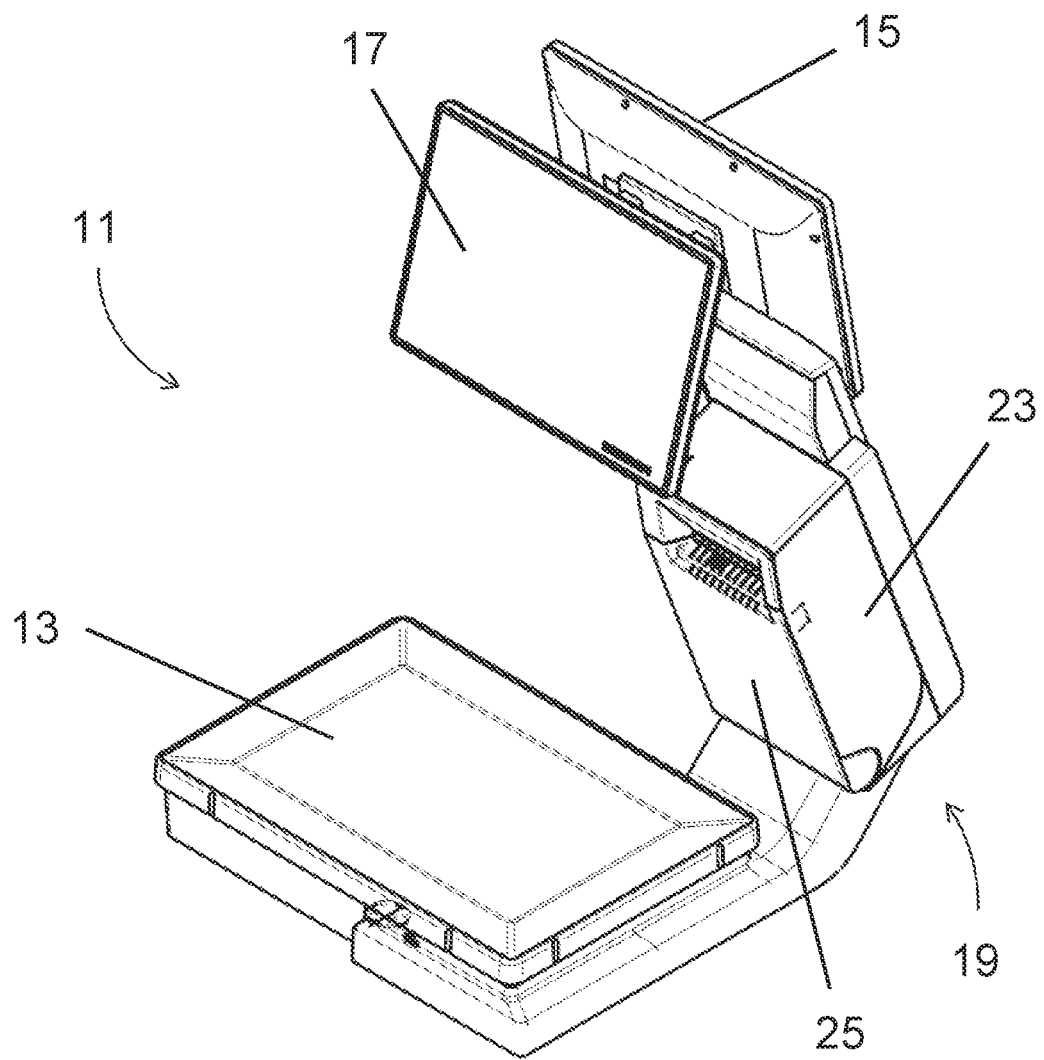

element or the cartridge, or vice versa, and with, in a closed state of the housing element, the reflection light barrier and the further light receiver being arranged at two mutually oppositely disposed sides of the paper path. A control unit is configured to detect the state of the label printer based on a joint evaluation of the reception intensity of the light receiver of the reflection light barrier and the reception intensity of the further light receiver.

25 Claims, 10 Drawing Sheets

(56) References Cited

U.S. PATENT DOCUMENTS

2015/0273882 A1* 10/2015 Akahori ................. B41J 3/4075
  347/16
2023/0209173 A1* 6/2023 Kim ..................... H04N 23/957

* cited by examiner

LABEL PRINTER

The invention relates to a label printer for printing on a paper tape wound onto a roll, said label printer comprising a printer housing in which a reception space for the roll with the paper tape or for a cartridge comprising the roll with the paper tape is provided, wherein the paper tape can be placed into a paper path and transported along the paper path; a housing element, in particular a housing door, that is attached to the printer housing, that is foldable between an open position and a closed position, and that enables access to the reception space for the insertion and removal of the roll or the cartridge in the open position and prevents access in the closed position; and a control unit that is configured to detect the state of the label printer, namely whether the housing element is closed or the cartridge is inserted and whether the paper tape is placed into the paper path.

The control unit requires various sensors to determine the status of the label printer. On the one hand, it has to be checked whether the printer door is closed or whether the cartridge is inserted into the printer. The printer is only operational in this case. When the printer door is open or the cartridge is not inserted or not fully inserted, the printer is not in a functional state. A door sensor is provided for the check. On the other hand, it has to be checked whether a paper tape is placed into the paper path. Only then can printing be performed. If there is no paper tape in the paper path, the paper tape has to be correctly placed into the paper path. A paper sensor is provided for this purpose.

A label printer comprising a door sensor and a paper sensor is known, for example, from the document EP 2 103 531 A1. The door sensor comprises a light barrier that comprises a transmitter and a receiver, that is provided at the printer housing, and that can be interrupted in the closed position by a projection provided at the printer door. The paper sensor is usually configured as a forked light barrier, in which the transmitter and the receiver are present in a U shape, wherein the margin of the paper tape is guided between the transmitter and the receiver. However, such a sensor system comprising two transmitters and two receivers is expensive, i.e. associated with correspondingly high manufacturing costs.

It is the underlying object of the invention to provide a label printer of the initially named kind that provides an inexpensive possibility of performing the detection of the state of the label printer.

This object is satisfied by a label printer having the features of claim 1, and in particular in that a reflection light barrier, comprising a light transmitter for transmitting a transmission light beam and a light receiver for receiving a reflected portion of the transmission light beam, and a further light receiver for receiving a transmitted portion of the transmission light beam are provided, with the reflection light barrier being provided at the printer housing and the further light receiver being provided at the housing element or the cartridge, or vice versa, i.e. the reflection light barrier is provided at the housing element or the cartridge and the further light receiver is provided at the primer housing, and with, in a closed state of the housing element, the reflection light barrier and the further light receiver being arranged at two mutually oppositely disposed sides of the paper path, and in that the control unit is configured to detect the state of the label printer based on a joint evaluation of the reception intensity of the light receiver of the reflection light barrier and the reception intensity of the further light receiver.

In accordance with the invention, only one transmitter and two receivers are required. Compared to label printers known from the prior art, a transmitter can be spared. The specific placement and arrangement of the reflection light barrier and the further receiver makes it possible to dispense with a second transmitter. In other words, the transmitter of the paper sensor can also be used to detect whether the housing element is closed and/or the cartridge is inserted or the transmitter of the door sensor can also be used to detect whether the paper tape is placed into the paper path. Ultimately, in accordance with the invention, the door sensor or the label sensor are combined with one another.

The joint evaluation of the two reception intensities means that both the reception intensity of the light receiver of the reflection light barrier and the reception intensity of the further light receiver have to be evaluated to detect the state of the label printer. The evaluation of only the reception intensity of the light receiver of the reflection light barrier or of only the reception intensity of the further light receiver is not sufficient for this purpose.

As already mentioned, the roll with the paper tape can also be included in a cartridge, which is also referred to as a tape cartridge, wherein the cartridge can be received in the reception space. The reception space is then a cartridge compartment. When using a cartridge, instead of the check whether the printer door is closed, it can be checked whether the cartridge is inserted. The check whether the cartridge is inserted does not exclude the check whether the printer door is open, and vice versa.

The detection of the state that the paper tape is not placed into the paper path can mean that after the insertion of the roll or the cartridge into the reception space, in particular after a change of the roll or the cartridge, the paper tape has not yet been placed into the paper path by the operator, or that the paper end has been reached.

The light transmitter can, for example, be a laser diode that in particular has a wavelength in the visible red light range or infrared light range. The two receivers can, for example, be a photodiode or a phototransistor. The transmission light beam can be modulated to reduce the sensitivity of the two light receivers with respect to external light, in particular environmental light. For this reason, a filter can also in each case be arranged in front of the two light receivers, by which filter external light in the visible range can be filtered out, for example.

It is generally also possible for the further light receiver to be part of a further reflection light barrier comprising a further light transmitter, wherein provision is made that the further light transmitter is inactive or is not used. Compared to the prior art, the advantage of lower costs also results in this respect since the further light transmitter does not have to be connected, operated, or maintained.

The label printer comprises a printhead and a counter-element thereto, in particular a print roller, wherein the paper path is predefined such that the paper tape can be guided between the printhead and the counter-element. The reflection light barrier and the further light receiver are connected upstream of the printhead and the counter-element, in particular at a distance of no more than 10 cm, in particular no more than 5 cm, viewed in the transport direction of the paper tape.

The control unit is in particular configured, in the case of a transmission light beam transmitted by the light transmitter, i.e. when a transmission light beam is transmitted by the light transmitter, to detect that the housing element is open or the cartridge is not inserted when the reception intensity of the light receiver of the reflection light barrier is smaller than a predefined reflection reference value and the reception intensity of the further light receiver is smaller than a predefined transmission reference value, and that otherwise the housing element is closed or the cartridge is inserted. When the housing element is open, the two light receivers at least substantially only receive environmental light.

If the further light receiver is provided at the cartridge and the cartridge is not inserted and the further light receiver cannot supply a reception signal to the control unit, in particular due to a lack of electrical contact, this corresponds to a further light receiver that is connected to the control unit and that does not see any light, i.e. has a reception intensity that is smaller than the predefined transmission reference value, so that even in this case it can be correctly detected that the cartridge is not inserted. This applies accordingly to the light receiver of the reflection light barrier if the reflection light barrier is provided at the cartridge, and in particular also if the light transmitter of the reflection light barrier does not transmit a transmission light beam due to a lack of electrical contact.

The control unit can be configured to detect to detect beforehand, when the light transmitter is deactivated, i.e. when no transmission light beam is transmitted by the light transmitter, that the housing element is open or the cartridge is not inserted when the reception intensity of the light receiver of the reflection light barrier is larger than a predefined reflection limit value and/or the reception intensity of the further light receiver is larger than a predefined transmission limit value. If light is received when the light transmitter is deactivated, this can only be external or environmental light.

In this respect, provision is preferably made that the predefined reflection limit value is smaller than the predefined reflection reference value and/or that the predefined transmission limit value is smaller than the predefined transmission reference value. With these values, the detection of the state of the label printer can be performed with particularly high reliability.

Furthermore, provision can be made that—if it has been detected that the housing element is closed or the cartridge is inserted the control unit is configured to subsequently detect whether the paper tape is placed into the paper path. The check whether the paper tape is placed into the paper path can therefore be provided temporally after the check whether the housing element is closed or the cartridge is inserted and is in particular only performed in the case that it was previously detected that the housing element is closed or the cartridge is inserted.

The control unit is preferably configured to detect, in the case of a transmission light beam transmitted by the light transmitter, that the paper tape is not placed into the paper path when the reception intensity of the light receiver of the reflection light barrier is smaller than a predefined reflection threshold value or the reception intensity of the further light receiver is larger than a predefined transmission threshold value, and that otherwise the paper tape is placed into the paper path. When no paper tape is inserted, only a little light is reflected, and indeed by the further light receiver that receives a lot of light from the light transmitter.

In this respect, provision is preferably made that the predefined reflection threshold value is smaller than the aforementioned predefined reflection reference value and/or that the predefined transmission threshold value is larger than the predefined transmission reference value. With these values, the detection of the state of the label printer can be performed with particularly high reliability.

Provision is in particular made that the control unit is configured to block the printing operation of the label printer if it has been detected based on the joint evaluation of the reception intensity of the light receiver of the reflection light barrier and the reception intensity of the further light receiver that the housing element is open or the cartridge is not inserted or the paper tape is not placed into the paper path. The label printer is then not ready to print.

In accordance with a preferred embodiment, the control unit is configured, in the case of a transmission light beam transmitted by the light transmitter, to distinguish paper tape types from one another, based on at least one of the two reception intensities, that differ from one another in their reflection capability and/or their light transmission, in particular in the location dependence of their reflection capability and/or their light transmission in the tape direction. The operation of the label printer can then be adapted to the paper tape type detected in each case. The paper tape type can in particular be a label tape or an endless tape. A label tape is, for example, a carrier tape with self-adhesive labels applied thereto, a self-adhesive linerless tape with blackmarks, and a carrier tape with self-adhesive labels and blackmarks applied thereto. An endless tape is, for example, to be understood as a self-adhesive linerless tape without blackmarks and a non-self-adhesive receipt paper.

Specifically, the control unit can be configured, in the case of a transmission light beam transmitted by the light transmitter and in the case of a paper tape placed into the paper path and transported along the paper path, to detect, based on a time development of the reception intensity of the further light receiver, in particular over a predefined time period, whether the paper tape is a paper tape of a first type whose light transmission varies in the tape direction in accordance with a repeating pattern, in particular a label tape such as is explained above, or a paper tape of a second type whose light transmission is constant in the tape direction, in particular an endless tape such as is explained above. The predefined time period can in particular result from a predefined time value or an offsetting of a predefined distance by which the paper tape is transported with the transport speed of the paper tape.

In this respect, it is preferred if the control unit is configured to detect that the paper tape is a paper tape of the first type when the time development of the reception intensity of the further light receiver changes from a first value to a second value, which differs from the first value by at least a predefined reference difference, and that otherwise the paper tape is a paper tape of the second type. By changing the reception intensity of the further light receiver from the first value to the second value, a label gap can be recognized. However, if the value of the reception intensity of the further light receiver remains constant within a fluctuation range, there is no label gap.

Provision can be made that the reflection light barrier and the further light receiver are arranged centrally with respect to the paper path. Thus, the label printer can be operated such that the paper tape used is always aligned centrally with the paper path and does not have to abut the margin of the paper path, as is necessary with the forked light barriers known from the prior art. This can in particular provide an advantage when narrow paper tapes are used.

Furthermore, a cable connection can be provided via which the further light receiver provided at the housing element or the reflection light barrier provided at the housing element are electrically connected to the printer housing. Alternatively or additionally, electrical contacting elements, e.g. spring contact pins, can be provided that establish an electrical contact between the printer housing and the further light receiver provided at the cartridge or the reflection light barrier provided at the cartridge when the cartridge is inserted into the reception space.

The invention further relates to a scale, in particular a store scale, comprising a label printer as described above.

The invention furthermore relates to a method for operating a label printer for printing on a paper tape wound onto a roll, the label printer comprising a printer housing in which a, reception space for the roll with the paper tape or for a cartridge comprising the roll with the paper tape is provided, wherein the paper tape can be placed into a paper path and transported along the paper path; and a housing element that is attached to the printer housing, that is foldable between an open position and a closed position, and that enables access to the reception space for the insertion and removal of the roll or the cartridge in the open position and prevents access in the closed position, wherein, in the method, the state of the label printer is detected by means of a control unit, namely whether the housing element is closed or the cartridge is inserted and whether the paper tape is placed into the paper path. The method is characterized in that a reflection light barrier, comprising a light transmitter and a light receiver, and a further light receiver are provided, with the reflection light barrier being provided at the printer housing and the further light receiver being provided at the housing element or the cartridge, or vice versa, and with, in a closed state of the housing element, the reflection light barrier and the further light receiver being arranged at two mutually oppositely disposed sides of the paper path, and with a transmission light beam being transmitted by the light transmitter, a reflected portion of the transmission light beam being received by the light receiver of the reflection light barrier, and a transmitted portion of the transmission light beam being received by the further light receiver, and with the reception intensity of the light receiver of the reflection light barrier and the reception intensity of the further light receiver being jointly evaluated by means of the control unit and the state of the label printer being detected based on the joint evaluation.

Advantageous embodiments of the method in accordance with the invention result analogously to the above-described advantageous embodiments of the label printer in accordance with the invention.

Further advantageous embodiments of the invention are described in the dependent claims, in the description of the Figures, and in the drawing.

Non-restricting embodiments of the invention are shown in the drawing and will be described in the following.

Figure 2A:
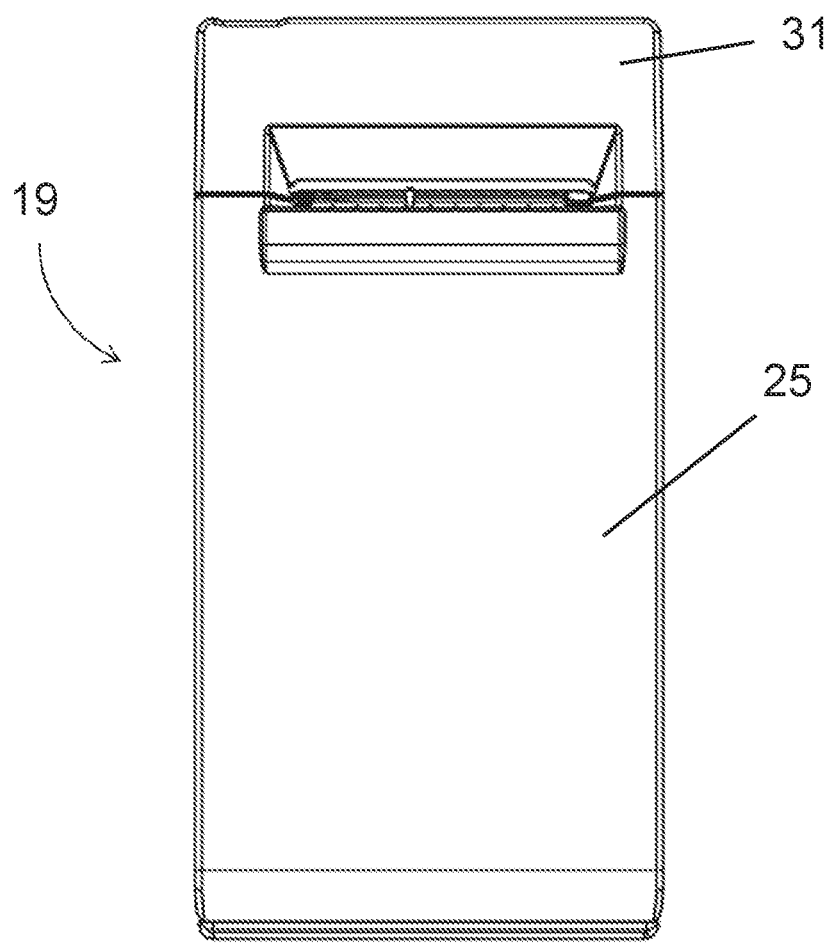
Figure 3:
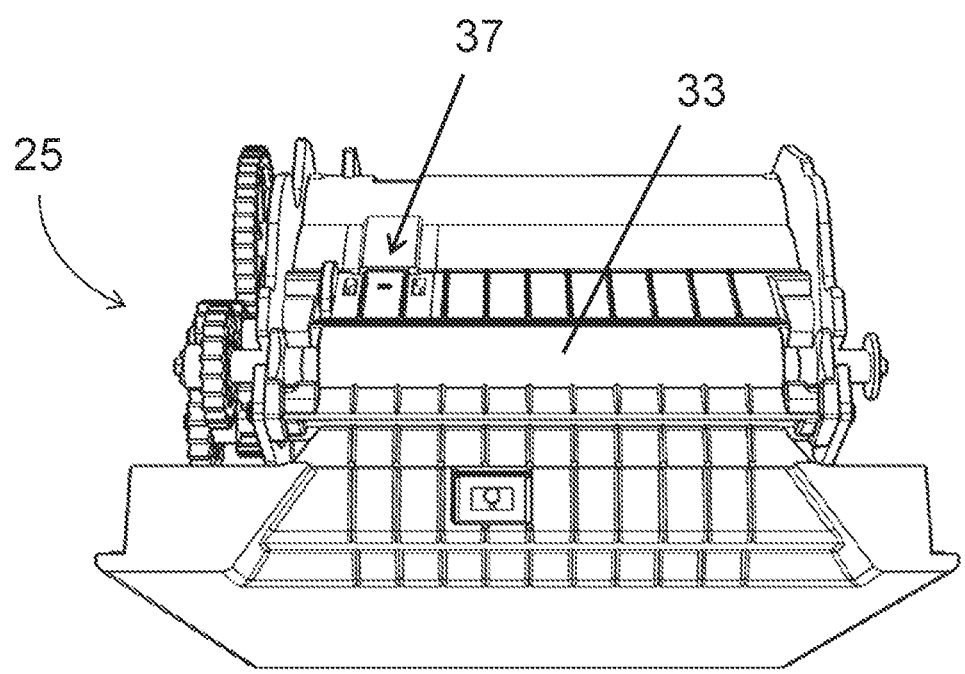
Figure 4:
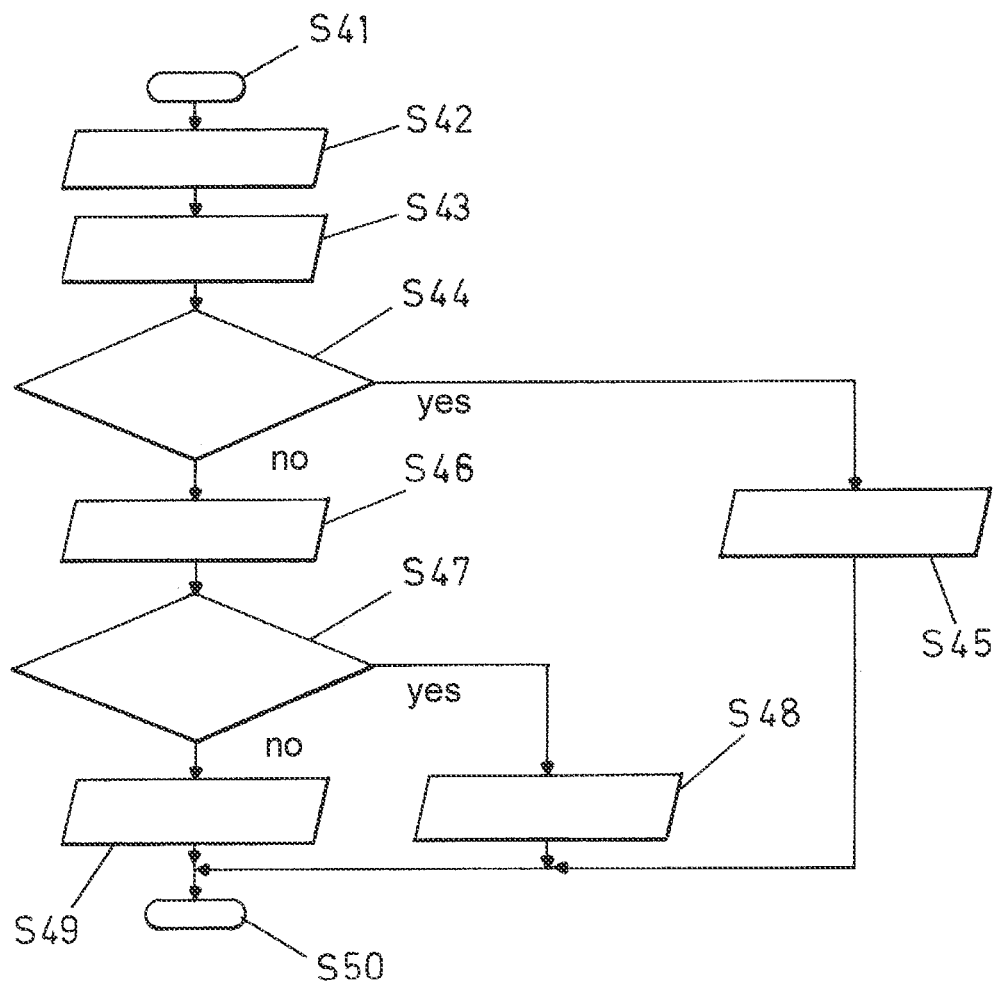
Figure 5:
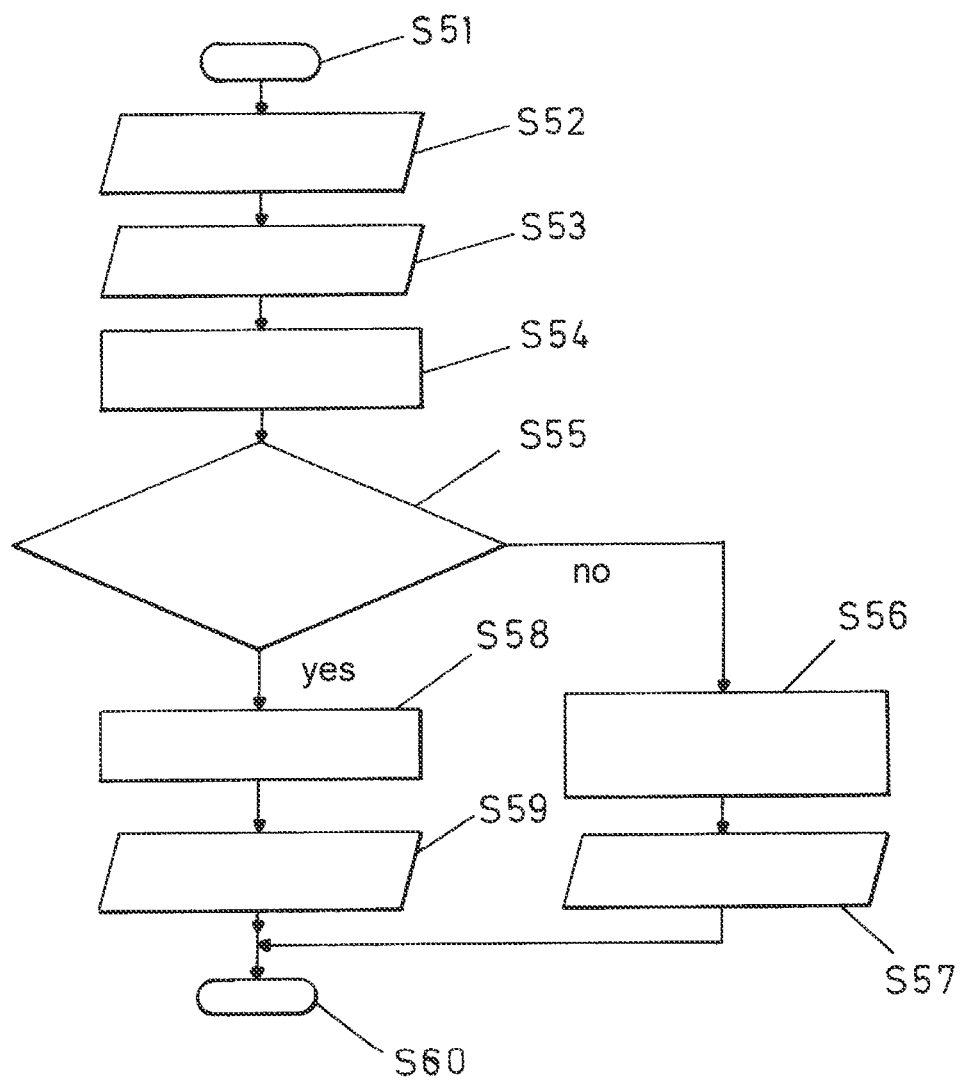
Figure 6:
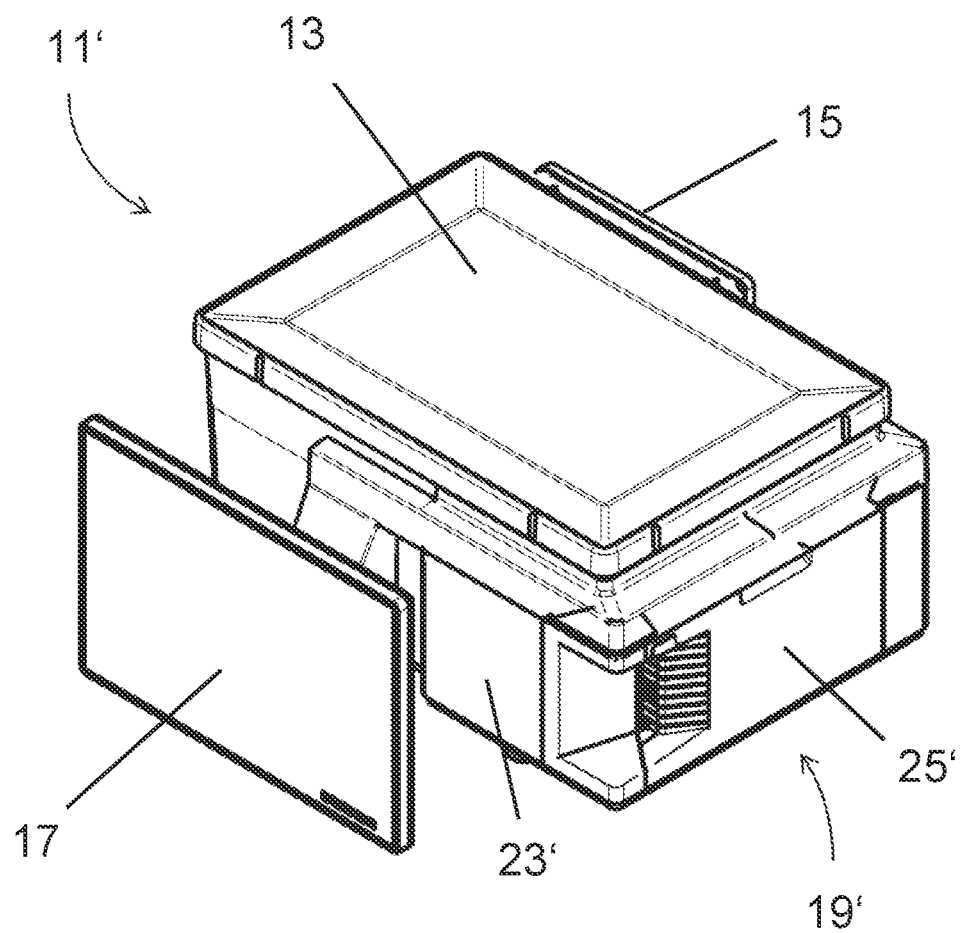
Figure 7:
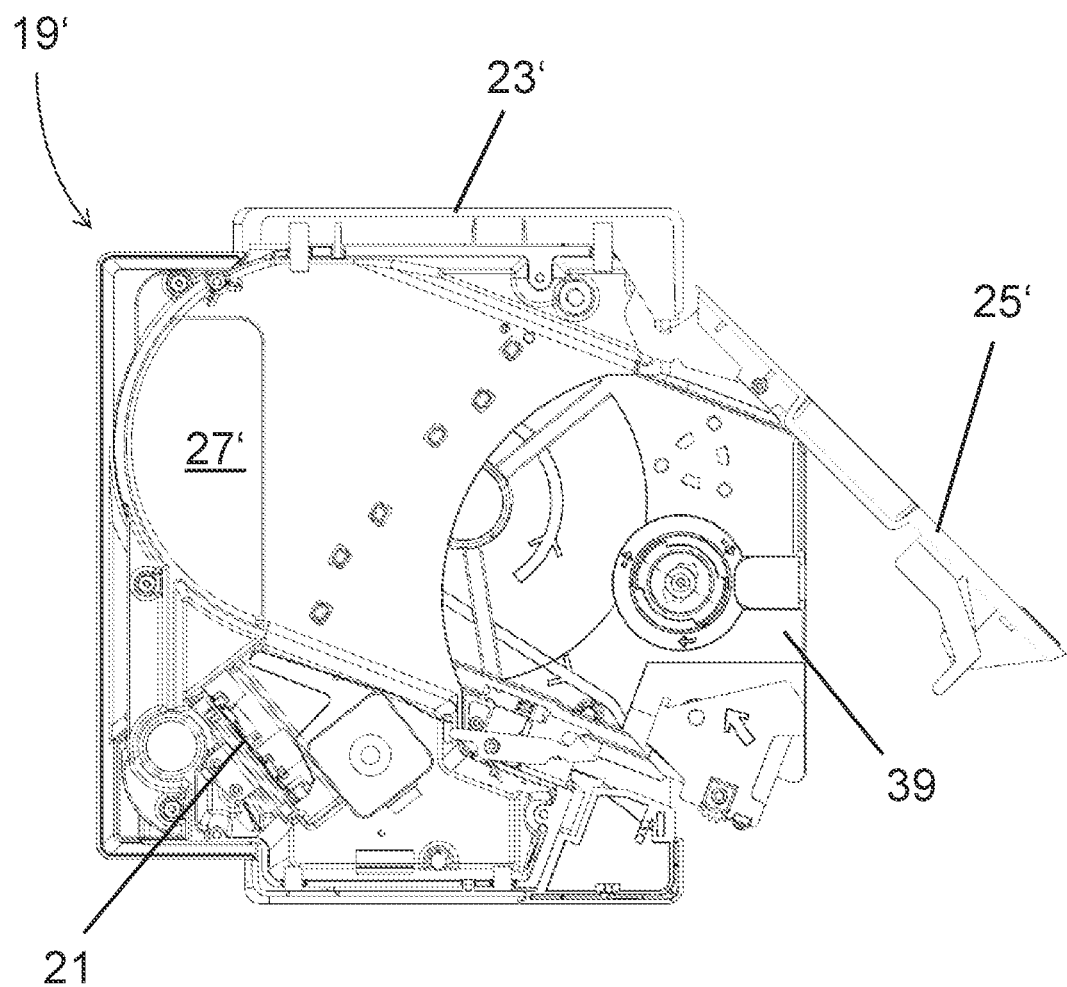
Figure 8:
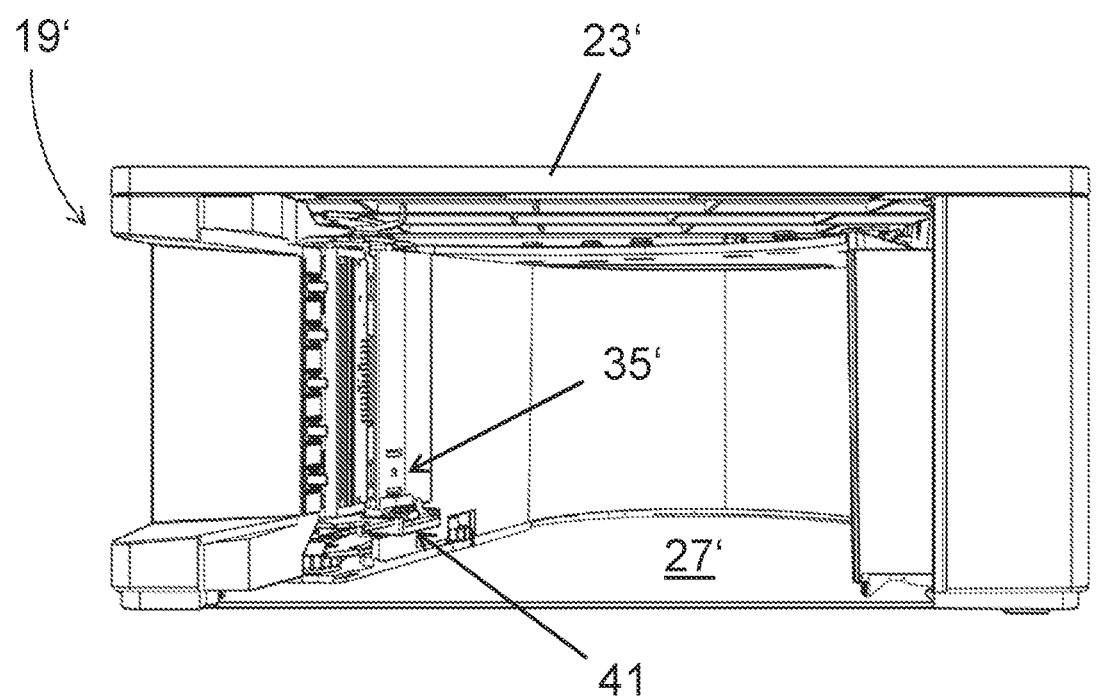
Figure 9:
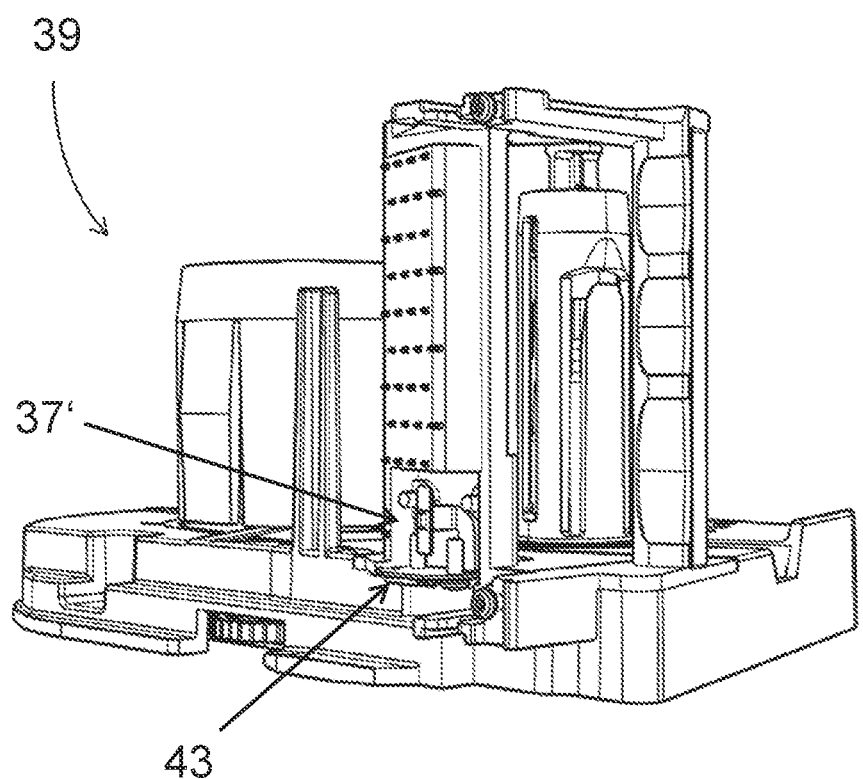

There are shown, in a schematic representation in each case,

FIG. 1 a scale, in particular a store scale, comprising a label printer in accordance with a first embodiment of the invention;

FIGS. 2A, B the label printer of FIG. 1 in an individual representation from the front with a printer door and in a representation in which the printer door is omitted;

FIG. 3 the printer door of FIG. 2A in an unfolded state;

FIG. 4 a flowchart fir recognizing the state of the label printer of FIG. 1;

FIG. 5 a flowchart for recognizing the inserted paper tape type;

FIG. 6 a scale, in particular a store scale, comprising a label printer in accordance with a second embodiment of the invention;

FIG. 7 the label printer of FIG. 6 with a cartridge compartment, a partly inserted tape cartridge, and a partly opened printer door in a plan view;

FIG. 8 the label printer of FIG. 6 in a side view, wherein the printer door is omitted; and FIG. 9 the tape cartridge of FIG. 7 in an individual representation.

The exemplary store scale 11 shown in FIG. 1 comprises a load plate 13 that determines the weight of an item disposed on it and that is displayed both on a display 15 for the customer and on a display 17 for the salesperson. The display 17 is configured as a touch screen such that the store scale 11 can also be operated via it. An identification number (PLU) associated with the respective item can be entered via the touch screen 17 such that a price for the item can be calculated by adding the weight and the price is then likewise displayed on the two displays 15, 17. Furthermore, the store scale comprises a label printer 19 to print the weight, the name of the item, and the calculated price on the label.

Figure 2B:
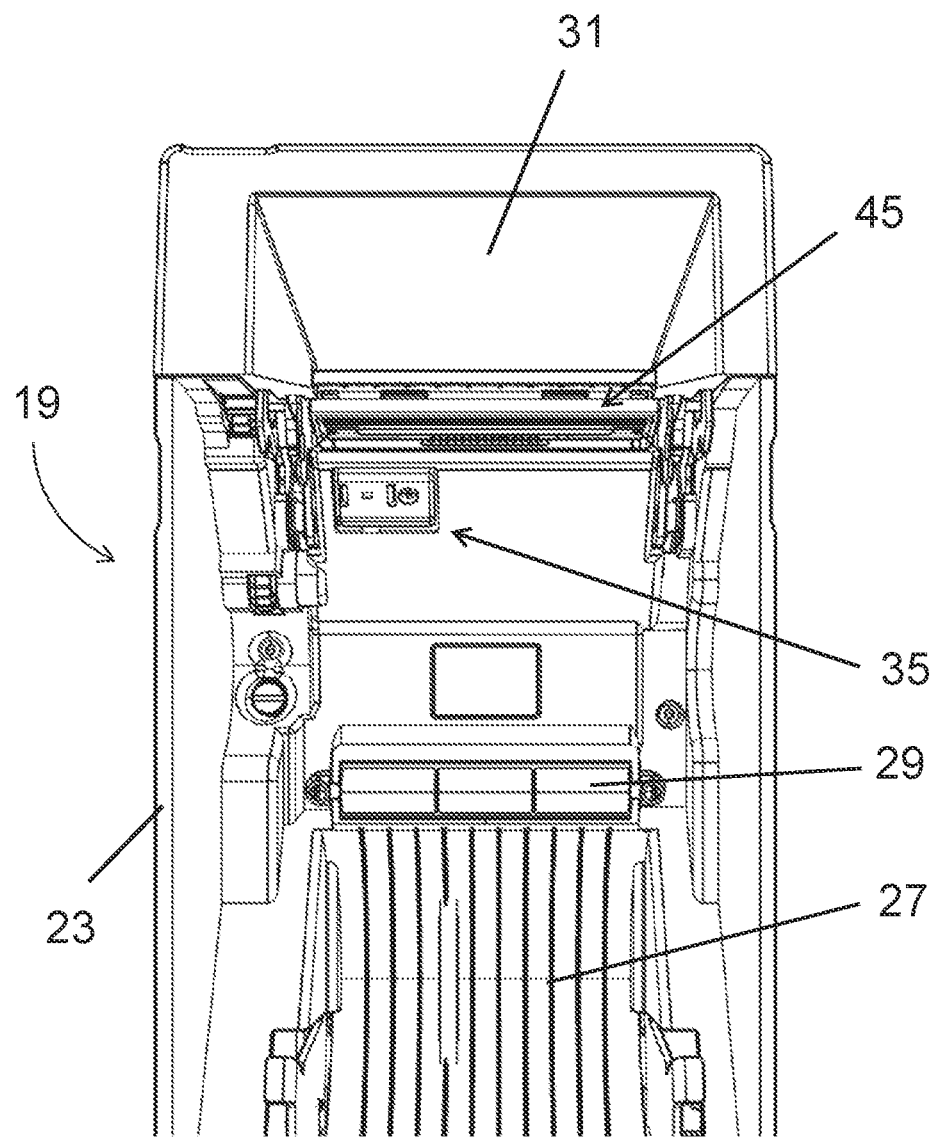

The label printer 19 comprises a printer housing 23 and a housing element attached in an articulated manner thereto in the form of a printer door 25 that is movable between a closed position, Which is shown in FIGS. 1 and 2A, and an open position that can be seen from FIG. 3. In FIG. 2B, the printer door 25 is omitted so that the interior of the label printer 19 can be viewed. A reception space 27 is visible in the interior of the label printer 19. When the printer door 25 open, a roll with paper tape on which printing is performed can be inserted into the reception space 27 or a used paper tape roll can be removed from the reception space 27, After inserting the roll, the start of the paper tape is unwound and placed into the paper path of the label printer 19. The paper tape can then be transported along the paper path via a driven pressure roller 33 that is attached to the inner side of the printer door 25, as can be seen from FIG. 3. Furthermore, a deflection roller 29 for the paper tape and a printhead 45 are visible.

The label printer 19 can be operated with a self-adhesive linerless tape or with a non-self-adhesive receipt paper. Therefore, the label printer 19 has a generally known cutter which, in FIG. 2B, is covered, however, by a front-side cover element 31 and by which individual labels can be separated from the linerless tape or the receipt paper. However, the label printer 19 can also be operated with a carrier tape with self-adhesive labels applied thereto.

The control unit, not visible, arranged at the printer housing side is configured to detect the state of the label printer 19, namely whether the printer door 25 is closed and whether the paper tape is placed into the paper path. For this purpose, the label printer 19 comprises a reflection light barrier 35 (cf. FIG. 213), which is provided at the printer housing side and which comprises a light transmitter and a light receiver, and a further light receiver 37 (cf. FIG. 3) that is provided at the printer door side and that is connected to the control unit via a cable connection. However, the arrangement can also be reversed. In both cases, the arrangement is such that, when the printer door 25 is closed, the reflection light barrier 35 and the further light receiver 37 are arranged at two mutually oppositely disposed sides of the paper path. In operation, the light transmitter of the reflection light barrier 35 transmits a transmission light beam, wherein a reflected portion of the transmission light beam is received by the light receiver of the reflection light barrier 35 and a transmitted portion of the transmission light beam is received by the further light receiver 37. The control unit is then configured to detect the aforementioned state of the label printer 19 based on a joint evaluation of the two reception intensities of the light receiver of the reflection light barrier and the further light receiver 37.

The method steps that are performed to recognize the state of the label printer 19 are shown in FIG. 4. In step S41, the method starts. In step S42, the light transmitter of the reflection light barrier 35 transmits a transmission light beam. In step S43, a reflected portion of the transmission light beam is detected by the light receiver of the reflection light barrier 35 and a transmitted portion of the transmission light beam is detected by the further light receiver 37. In step S44, it is checked whether the printer door 25 is open. For this purpose, it is checked whether the reception signal intensity of the light receiver of the reflection light barrier 35 is smaller than a predefined reflection reference value, for example 1000, and the reception intensity of the further light receiver 37 is smaller than a predefined transmission reference value, for example 250. If this is the case, it is determined in accordance with step S45 that the printer door 25 is open. The label printer 19 is not ready to print. The method for recognizing the state of the label printer 19 is ended in accordance with step S50. If this is not the case, it is determined in accordance with step S46 that the printer door 25 is closed. In step S47, it is checked whether the paper tape is not placed into the paper path. For this purpose, it is checked whether the reception intensity of the light receiver of the reflection light barrier 35 is smaller than a predefined reflection threshold value, for example 900, or the reception intensity of the further light receiver 37 is larger than a predefined transmission threshold value, for example 3000. If this is the case, it is determined in accordance with step S48 that the paper tape is not placed into the paper path. The label printer 19 is not ready to print. The method for recognizing the state of the label printer 19 is ended in accordance with step S50. If this is not the case, it is determined in accordance with step S49 that the paper tape is placed into the paper path. The label printer 19 is ready to print. The method for recognizing the state of the label printer 19 is ended in accordance with step S50.

The above-explained evaluation of the two reception intensities of the light receiver of the reflection light barrier 35 and the further light receiver 37 takes place in the case of a transmission light beam transmitted by the light transmitter, i.e. when a transmission light beam is transmitted by the light transmitter. Provision can additionally be made that the two reception intensities of the light receiver of the reflection light barrier 35 and of the further light receiver 37 are already evaluated before step S42 when the light transmitter is still deactivated, i.e. when no transmission light beam is yet transmitted by the light transmitter. In this respect, it can be detected that the printer door 25 is open when the reception intensity of the light receiver of the reflection light barrier 35 is larger than a predefined reflection limit value, for example 10, and/or the reception intensity of the further light receiver 37 is larger than a predefined transmission limit value, for example 10, as can be the case due to external or environmental light. If it is detected when the light transmitter is deactivated that the printer door 25 is open, the label printer 19 is not ready to print. The method is ended in accordance with step S50. If, when the light transmitter is deactivated, it is not detected that the printer door 25 is open, the method continues with step S42.

As can be seen from the above-explained method for recognizing the state of the label printer 19, the printing operation of the label printer 19 is blocked if it has been detected, based on the joint evaluation of the reception intensity of the light receiver of the reflection light Maier 35 and the reception intensity of the further light receiver 37, that the printer door 25 is open or the paper tape is not placed into the paper path.

Furthermore, it can be detected which paper tape type is used in the label printer 19, i.e. whether a label tape (in which the label length of the separated labels is predefined) or an endless tape (in which the label length of the separated labels is not predefined) is used. The method steps that are carried out to recognize the paper tape type used are shown in FIG. 5. In step S51, the method starts. In step S52, a maximum label length stored in the label printer 19, for example 20 cm, is read in. In step S53, the light transmitter of the reflection light barrier 35 transmits a transmission light beam and the paper tape is transported along the paper path. In step S54, over the time period until the paper tape has been transported by the stored label length, a reflected portion of the transmission light beam is detected by the light receiver of the reflection light barrier 35 and a transmitted portion of the transmission light beam is detected by the further light receiver 37. In step S55, it is checked whether the reception intensity of the further light receiver 37 changes within the time period from a first value, for example 1400 (e.g. backing paper and label), to a second value, for example 2500 (e.g. backing paper only), that differs from the first value by at least a predefined reference difference. If this is not the case, no label gap is recognized in accordance with step S56. In accordance with step S57, it is determined that an endless tape is used. The method for recognizing the paper tape type used is ended in accordance with step S60. If this is the case, a label gap is recognized in accordance with step S58. In accordance with step S59, it is determined that a label tape is used. The method for recognizing the paper tape type is ended in accordance with step S60.

The values mentioned in connection with FIGS. 4 and 5 are given as dimensionless quantities, with the exception of the label length mentioned, since only the ratio of these values is important for the method steps S41 to SW.

In FIG. 6, a further store scale 11' comprising a further label printer 19' is shown. Unlike the store scale in accordance with FIG. 1, the label printer 19' is not arranged at a stand, but is located beneath the load plate 13. Furthermore, the customer display 15 and the operator touchscreen 17 are arranged in the region of the load plate 13.

In accordance with FIG. 7, the label printer 19' likewise comprises a printer housing 23' in which a reception space 27' is formed in the form of a cartridge compartment into which a tape cartridge 39 comprising a roll with the paper tape can be inserted. Furthermore, a housing element attached to the printer housing 23' in a manner foldable about an axis of rotation is also provided in the form of a printer door 25' that is adjustable between an open position and a closed position. In the open position of the printer door 25', the access to the reception space 27 is unobstructed, i.e. the tape cartridge 39 can be inserted into the reception space 27 or removed from the reception space 27. In the closed position of the printer door 25', in contrast, this is not the case since the access is then closed.

Furthermore, a control unit 21 is provided that can detect the state of the label printer 19' analogously to the control unit of the label printer 19, wherein, in the case of the label printer 19', the focus is, however, not on whether the printer door 25' is closed, but rather on whether the tape cartridge 39 is inserted into the reception space 27'. For this purpose, the label printer 19' likewise comprises a reflection light barrier 35' (cf. FIG. 8), which is provided at the printer housing side and which comprises a light transmitter and a light receiver, and a further light receiver 37' (cf FIG. 9) that is provided at the printer door side and that is connected to the control unit 21 via electrical contacting elements 41, e.g. spring contact pins, and corresponding contact surfaces 43. The arrangement can also be reversed here and, in both cases, the arrangement is here also such that, when the tape cartridge 39 is inserted, the reflection light barrier 35' and the further light receiver 37' are arranged at two mutually oppositely disposed sides of a paper path of the label printer 19'.

REFERENCE NUMERAL LIST

11, 11' store scale
13 load plate
15 customer display
17 operator touch screen
19, 19' label printer
21 control unit
23, 23' printer housing
25, 25' printer door
27, 27' reception space
29 deflection roller
31 cover element
33 print roller
35, 35' reflection light barrier
37, 37' further light receiver
39 tape cartridge
41 electrical contacting elements
43 contact surfaces
45 printhead
S41-S60 method step

The invention claimed is:

1. A label printer for printing on a paper tape wound onto a roll, said label printer comprising
a printer housing in which a reception space for the roll with the paper tape or for a cartridge comprising the roll with the paper tape is provided, wherein the paper tape can be placed into a paper path and transported along the paper path;
a housing element that is attached to the printer housing, that is foldable between an open position and a closed position, and that enables access to the reception space for the insertion and removal of the roll or the cartridge in the open position and prevents access in the closed position; and
a control unit that is configured to detect the state of the label printer, namely whether the housing element is closed or the cartridge is inserted and whether the paper tape is placed into the paper path,
wherein a reflection light barrier, comprising a light transmitter for transmitting a transmission light beam and a light receiver for receiving a reflected portion of the transmission light beam, and a further light receiver for receiving a transmitted portion of the transmission light beam are provided, with the reflection light barrier being provided at the printer housing and the further light receiver being provided at the housing element or the cartridge, or vice versa, and with, in a closed state of the housing element, the reflection light barrier and the further light receiver being arranged at two mutually oppositely disposed sides of the paper path, and
wherein the control unit is configured to detect the state of the label printer based on a joint evaluation of the reception intensity of the light receiver of the reflection light barrier and the reception intensity of the further light receiver.

2. The label printer in accordance with claim 1,
wherein the control unit is configured to detect, in the case of a transmission light beam transmitted by the light transmitter, that the housing element is open or the cartridge is not inserted when the reception intensity of the light receiver of the reflection light barrier is smaller than a predefined reflection reference value and the reception intensity of the further light receiver is smaller than a predefined transmission reference value, and that otherwise the housing element is closed or the cartridge is inserted.

3. The label printer in accordance with claim 2,
wherein the control unit is configured to detect beforehand, when the light transmitter is deactivated, i.e. when no transmission light beam is transmitted by the light transmitter, that the housing element is open or the cartridge is not inserted when the reception intensity of the light receiver of the reflection light barrier is larger than a predefined reflection limit value and/or the reception intensity of the further light receiver is larger than a predefined transmission limit value.

4. The label printer in accordance with claim 3,
wherein the predefined reflection limit value is smaller than the predefined reflection reference value, and/or wherein the predefined transmission limit value is smaller than the predefined transmission reference value.

5. The label printer in accordance with claim 2,
wherein, if it has been detected that the housing element is closed or the cartridge is inserted, the control unit is configured to subsequently detect whether the paper tape is placed into the paper path.

6. The label printer in accordance with claim 1,
wherein the control unit is configured to detect, in the case of a transmission light beam transmitted by the light transmitter, that the paper tape is not placed into the paper path when the reception intensity of the light receiver of the reflection light barrier is smaller than a predefined reflection threshold value or the reception intensity of the further light receiver is larger than a predefined transmission threshold value, and that otherwise the paper tape is placed into the paper path.

7. The label printer in accordance with claim 6,
wherein the control unit is configured to detect, in the case of a transmission light beam transmitted by the light transmitter, that the housing element is open or the cartridge is not inserted when the reception intensity of the light receiver of the reflection light barrier is smaller than a predefined reflection reference value and the reception intensity of the further light receiver is smaller than a predefined transmission reference value, and that otherwise the housing element is closed or the cartridge is inserted, and
wherein the predefined reflection threshold value is smaller than the predefined reflection reference value, and/or wherein the predefined transmission threshold value is larger than the predefined transmission reference value.

8. The label printer in accordance with claim 1,
wherein the control unit is configured to block the printing operation of the label printer if it has been detected based on the joint evaluation of the reception intensity of the light receiver of the reflection light barrier and the reception intensity of the further light receiver that the housing element is open or the cartridge is not inserted or the paper tape is not placed into the paper path.

9. The label printer in accordance with claim 1,
wherein the control unit is configured, in the case of a transmission light beam transmitted by the light transmitter, to distinguish paper tape types from one another, based on at least one of the two reception intensities, that differ from one another in their reflection capability and/or their light transmission.

10. The label printer in accordance with claim 1,
wherein the control unit is configured, in the case of a transmission light beam transmitted by the light transmitter and in the case of a paper tape placed into the paper path and transported along the paper path, to detect, based on a time development of the reception intensity of the further light receiver, whether the paper tape is a paper tape of a first type whose light transmission varies in the tape direction in accordance with a repeating pattern or a paper tape of a second type whose light transmission is constant in the tape direction.

11. The label printer in accordance with claim 10,
wherein the control unit is configured to detect that the paper tape is a paper tape of the first type when the time development of the reception intensity of the further light receiver changes from a first value to a second value, which differs from the first value by at least a predefined reference difference, and that otherwise the paper tape is a paper tape of the second type.

12. The label printer in accordance with claim 1,
wherein the reflection light barrier and the further light receiver are arranged centrally with respect to the paper path.

13. The label printer in accordance with claim 1,
wherein a cable connection is provided via which the further light receiver provided at the housing element or the reflection light barrier provided at the housing element are electrically connected to the printer housing, and/or
wherein electrical contacting elements, e.g. spring contact pins, are provided that establish an electrical contact between the printer housing and the further light receiver provided at the cartridge or the reflection light barrier provided at the cartridge when the cartridge is inserted into the reception space.

14. A scale, comprising a label printer for printing on a paper tape wound onto a roll, said label printer comprising
a printer housing in which a reception space for the roll with the paper tape or for a cartridge comprising the roll with the paper tape is provided, wherein the paper tape can be placed into a paper path and transported along the paper path;
a housing element that is attached to the printer housing, that is foldable between an open position and a closed position, and that enables access to the reception space for the insertion and removal of the roll or the cartridge in the open position and prevents access in the closed position; and
a control unit that is configured to detect the state of the label printer, namely whether the housing element is closed or the cartridge is inserted and whether the paper tape is placed into the paper path,
wherein a reflection light barrier, comprising a light transmitter for transmitting a transmission light beam and a light receiver for receiving a reflected portion of the transmission light beam, and a further light receiver for receiving a transmitted portion of the transmission light beam are provided, with the reflection light barrier being provided at the printer housing and the further light receiver being provided at the housing element or the cartridge, or vice versa, and with, in a closed state of the housing element, the reflection light barrier and the further light receiver being arranged at two mutually oppositely disposed sides of the paper path, and
wherein the control unit is configured to detect the state of the label printer based on a joint evaluation of the reception intensity of the light receiver of the reflection light barrier and the reception intensity of the further light receiver.

15. A method for operating a label printer for printing on a paper tape wound onto a roll, the label printer comprising
a printer housing in which a reception space for the roll with the paper tape or for a cartridge comprising the roll with the paper tape is provided, wherein the paper tape can be placed into a paper path and transported along the paper path; and
a housing element that is attached to the printer housing, that is foldable between an open position and a closed position, and that enables access to the reception space for the insertion and removal of the roll or the cartridge in the open position and prevents access in the closed position,
wherein, in the method, the state of the label printer is detected by means of a control unit, namely whether the housing element is closed or the cartridge is inserted and whether the paper tape is placed into the paper path,
wherein a reflection light barrier, comprising a light transmitter and a light receiver, and a further light receiver are provided, with the reflection light barrier being provided at the printer housing and the further light receiver being provided at the housing element or the cartridge, or vice versa, and with, in a closed state of the housing element, the reflection light barrier and the further light receiver being arranged at two mutually oppositely disposed sides of the paper path,
with a transmission light beam being transmitted by the light transmitter, a reflected portion of the transmission light beam being received by the light receiver of the reflection light barrier, and a transmitted portion of the transmission light beam being received by the further light receiver, and
with the reception intensity of the light receiver of the reflection light barrier and the reception intensity of the further light receiver being jointly evaluated by means of the control unit and the state of the label printer being detected based on the joint evaluation.

16. The method in accordance with claim 15,
wherein it is detected by means of the control unit, in the case of a transmission light beam transmitted by the light transmitter, that the housing element is open or the cartridge is not inserted when the reception intensity of the light receiver of the reflection light barrier is smaller than a predefined reflection reference value and the reception intensity of the further light receiver is smaller than a predefined transmission reference value, and that otherwise the housing element is closed or the cartridge is inserted.

17. The method in accordance with claim 16,
wherein it is detected beforehand by means of the control unit when the light transmitter is deactivated, i.e. when no transmission light beam is transmitted by the light transmitter, that the housing element is open or the cartridge is not inserted when the reception intensity of the light receiver of the reflection light barrier is larger than a predefined reflection limit value and/or the reception intensity of the further light receiver is larger than a predefined transmission limit value.

18. The method in accordance with claim 17,
wherein the predefined reflection limit value is smaller than the predefined reflection reference value, and/or wherein the predefined transmission limit value is smaller than the predefined transmission reference value.

19. The method in accordance with claim 16,
wherein, if it has been detected that the housing element is closed or the cartridge is inserted, it is subsequently detected by means of the control unit whether the paper tape is placed into the paper path.

20. The method in accordance with claim 15,
wherein it is detected by means of the control unit, in the case of a transmission light beam transmitted by the light transmitter, that the paper tape is not placed into the paper path when the reception intensity of the light receiver of the reflection light barrier is smaller than a predefined reflection threshold value or the reception intensity of the further light receiver is larger than a predefined transmission threshold value, and that otherwise the paper tape is placed into the paper path.

21. The method in accordance with claim 20,
wherein it is detected by means of the control unit, in the case of a transmission light beam transmitted by the light transmitter, that the housing element is open or the cartridge is not inserted when the reception intensity of the light receiver of the reflection light barrier is smaller than a predefined reflection reference value and the reception intensity of the further light receiver is smaller than a predefined transmission reference value, and that otherwise the housing element is closed or the cartridge is inserted, and
wherein the predefined reflection threshold value is smaller than the predefined reflection reference value, and/or wherein the predefined transmission threshold value is larger than the predefined transmission reference value.

22. The method in accordance with claim 15,
wherein the printing operation of the label printer is blocked by means of the control unit if it has been detected based on the joint evaluation of the reception intensity of the light receiver of the reflection light barrier and the reception intensity of the further light receiver that the housing element is open or the cartridge is not inserted or the paper tape is not placed into the paper path.

23. The method in accordance with claim 15,
wherein by means of the control unit, in the case of a transmission light beam transmitted by the light transmitter, paper tape types are distinguished from one another, based on at least one of the two reception intensities, that differ from one another in their reflection capability and/or their light transmission.

24. The method in accordance with claim 15,
wherein in the case of a transmission light beam transmitted by the light transmitter and in the case of a paper tape placed into the paper path and transported along the paper path, it is detected by means of the control unit, based on a time development of the reception intensity of the further light receiver, whether the paper tape is a paper tape of a first type whose light transmission varies in the tape direction in accordance with a repeating pattern or a paper tape of a second type whose light transmission is constant in the tape direction.

25. The method in accordance with claim 24,
wherein it is detected by means of the control unit that the paper tape is a paper tape of the first type when the time development of the reception intensity of the further light receiver changes from a first value to a second value that differs from the first value by at least a predefined reference difference, and that otherwise the paper tape is a paper tape of the second type.

* * * * *